Figure 1:
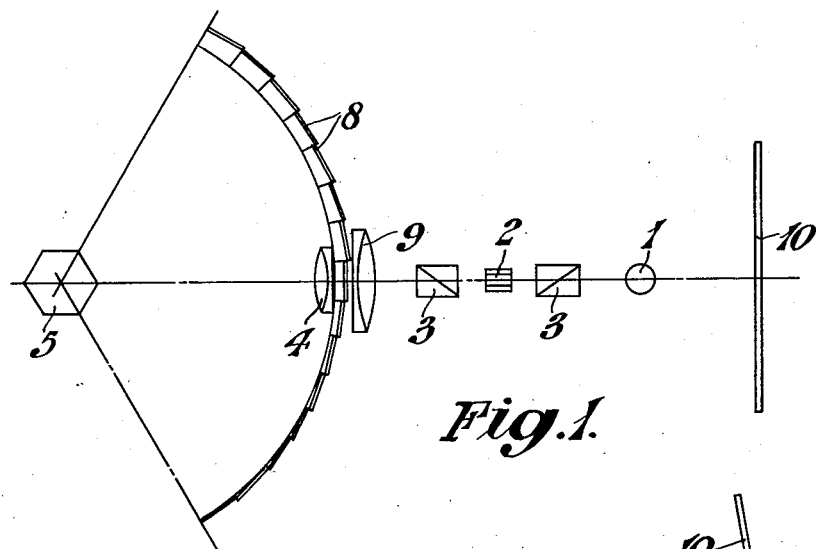

Feb. 9, 1937.  E. TRAUB  2,070,460

SCANNING DEVICE

Filed Sept. 13, 1934

Inventor:
Ernest Traub,
By Franks Appleman
Atty

Patented Feb. 9, 1937

2,070,460

UNITED STATES PATENT OFFICE 2,070,460

SCANNING DEVICE

Ernest Traub, London, England

Application September 13, 1934, Serial No. 743,915
In Great Britain September 18, 1933

12 Claims. (Cl. 178—6)

This invention relates to devices for the decomposition or composition of pictures, particularly for purposes of television, of the known kind in which the picture to be decomposed is thrown by a rotating reflecting member onto a fixed picture decomposition device, or the picture to be composed is received by a rotating reflecting member from a fixed picture composition device.

In one known device of this kind, the rotating reflecting member comprises one or more reflecting surfaces each parallel to the axis of rotation and is so arranged that (in the case of a device for the composition of pictures) each surface is also effective in reflecting onto fixed picture decomposition device, consisting of a series of mirrors each inclined at a different angle to the axis of the device, the rays which are to fall onto the rotating reflecting member and thence onto the screen. With this arrangement the number of mirrors in the fixed picture composition or decomposition device is necessarily equal to the number of scanning strips. If it is desired to increase the number of lines in the picture it is necessary to increase correspondingly the number of the fixed mirrors.

According to the present invention the rotating reflecting member is provided with two or more reflecting faces each inclined at a different angle to the axis of rotation; each of these reflecting faces acts in the same way as the rotating reflecting member of the device above referred to, but owing to the differences in their inclinations each of them produces a series of scanning lines which differ from that produced by each of the others. Thus the number of scanning lines is equal to the product of the number of fixed mirrors and the number of reflecting faces on the rotating member. For example a ninety-line picture can be produced with only fifteen fixed mirrors by employing a hexagonal rotating member.

Each of the reflecting faces of the rotating member may consist of a plane mirror which effects both of the required reflections, or each face may consist of two plane surfaces meeting at an angle, each surface effecting one of the two reflections, or some of the faces may be of one kind and the remainder of the other.

Devices for the composition or decomposition of pictures has already been proposed comprising a rotating mirror drum having a number of reflecting faces each inclined at a different angle to the axis of rotation, in combination with a series of fixed mirrors each inclined at a different angle to the axis of the device, so that the number of scanning strips would be equal to the product of the number of reflecting faces on the rotating drum and the number of fixed mirrors. In these prior proposals, however, the modulated light beam of a picture composition device was reflected from the rotating member onto the fixed mirrors and thence direct to the screen; in a picture decomposition device the path of the light was reversed passing from the object direct to the fixed mirrors and thence by reflection from the rotating member to the light sensitive element. This arrangement gives rise to considerable distortion of the picture particularly when (as is preferable for mechanical reasons) the number of reflecting surfaces on the rotating member is made small compared to the number of fixed mirrors. Such distortion is not produced by devices in accordance with the present invention.

Figure 2:
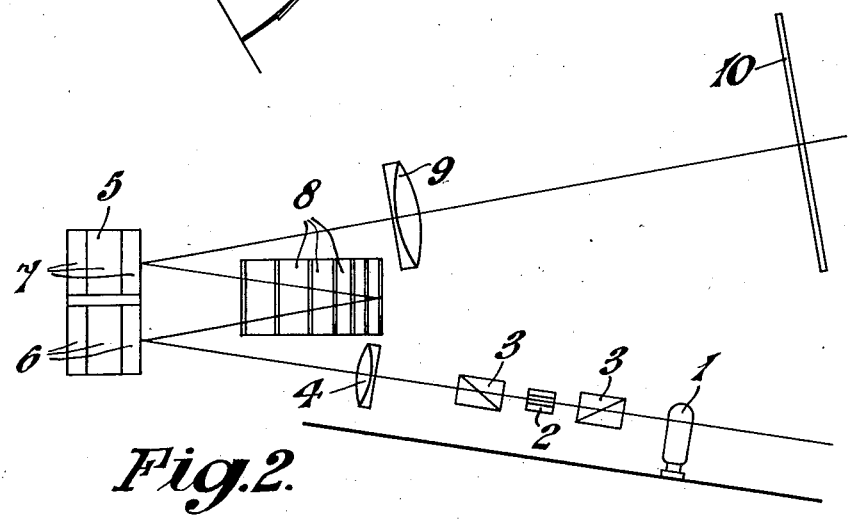
Figure 3:
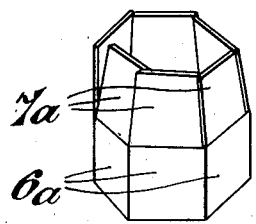

The accompanying drawing shows diagrammatically one form of receiver or picture composition device constructed in accordance with the invention, Figure 1 being a plan view and Figure 2 an elevation of the device, while Figure 3 is a perspective view of detail.

Referring to this drawing, and initially to Figures 1 and 2 thereof, light from a source 1 passes through a cell 2 which is arranged between Nicol prisms 3 and has applied to it an electric potential modulated in accordance with the picture to be produced. The modulated light is formed to a parallel beam by a lens 4 and thrown onto the lower part of a hexagonal drum 5 which rotates about a vertical axis. Each face carries two mirrors 6 and 7, one below the other, the mirror of each face being inclined at an angle to the vertical different from that of the mirrors of the adjacent faces. The light falling on the lower mirrors 6 of the drum is reflected onto a number of fixed mirrors 8 arranged along the arc of a circle and each inclined at an angle to the vertical different from that of the adjacent mirrors. From the fixed mirrors the light is reflected onto the upper mirrors 7 of the drum and from thence it passes through a lens 9 which brings the beam to a focus upon a translucent screen 10.

As the member 5 rotates the beam of light thrown by one of the mirrors 6 moves across the face of one of the fixed mirrors 8 and thus, by reflection from the corresponding mirror 7, draws a line across the screen. On further rotation of the member 5 the beam passes across another of the mirrors 8 and, owing to the varying inclinations of the mirrors 8, produces a second line across the screen. Similarly for all the mirrors 8, until the beam of light from the source is transferred to another of the mirrors 6. The process is then repeated, but owing to the varying inclination of the faces of the member 5 the second series of lines is differently placed on the screen from the first series. Similarly for all the faces of the member 5.

Figure 3 shows one possible arrangement of the mirrors on the member 5. The lower mirrors 6 are all parallel to the axis of rotation while the upper mirrors 7 each lie at a different angle to that axis. Thus each face of the mirror consists of two surfaces at an angle to each other.

Another possible arrangement of the mirrors on the member 5 would be to arrange the mirrors 6a in the same manner as the mirrors 7a. Thus the mirrors of each set would be differentially inclined to the axis of rotation so that a part of the differential displacement of the light beam would be effected at each reflection of the rotating member 5.

While the fixed mirrors 3 are shown arranged along the arc of a circle they may be arranged along other curves or even along a straight line provided that each of them is arranged substantially normal to a line joining its centre to the axis of rotation of the member 5. It has been found particularly suitable to arrange the fixed mirrors along a hyperbola.

In the particular device illustrated the optical system is formed by corrected spherical lenses, so that the beam of light has the same cross sectional shape throughout. However, the means for projecting the beam onto the rotating member may comprise a cylindrical lens having its longitudinal axis substantially at right angles to the axis of rotation, so that the beam of light will have the form of a line extending in the direction of movement of the rotating member, the means for receiving the beam after its second reflection from the rotating member comprising a second cylindrical lens having its longitudinal axis substantially parallel to the axis of rotation.

What I claim and desire to secure by Letters Patent is:—

1. A device for the composition or decomposition of pictures comprising means for projecting a beam of light, a rotating member, a set of rotating reflecting surfaces on said rotating member located in the path of said beam and adapted to reflect said beam of light at an angle, a set of stationary reflecting surfaces located in the path of the beam from said set of rotating reflecting surfaces and adapted to reflect said beam of light at an angle, a second set of rotating reflecting surfaces on said rotating member located in the path of the beam from said stationary reflecting surfaces and adapted to reflect said beam of light at an angle, means to receive the beam from said second set of rotating reflecting surfaces, the rotating reflecting surfaces of one of said sets being each inclined at an angle to the axis of rotation different from the angle at which the other surfaces of said set are inclined thereto, and the rotating reflecting surfaces of the other set being arranged parallel to said axis of rotation and at uniform angles to each other.

2. A device for the composition or decomposition of pictures comprising a polygonal rotating member having reflecting faces, a plurality of stationary reflecting surfaces, and means for projecting a beam of light successively onto the faces of one part of said rotating member, thence onto said stationary reflecting surfaces and thence back onto the faces of another part of said rotating reflecting member, the reflecting surfaces of one of said parts of said rotating member being arranged parallel to the axis of rotation thereof at uniform angles to each other, and the reflecting surfaces of said other part being each inclined at a different angle to said axis and to each other.

3. A device for the composition or decomposition of pictures, said device comprising means for projecting a beam of light, a rotating member having at least two sets of reflecting surfaces, the reflecting surfaces of one set being arranged at uniform angles to the axis of rotation of said member, said surfaces being adapted to receive said beam and reflect it at an angle to its original path, a plurality of fixed mirrors each inclined at different angles to planes radial to their centers and to the axis of said rotating member, said fixed mirrors being adapted to receive the light reflected from said first set of rotating reflecting surfaces and to reflect it back onto the surfaces of the second set of rotating reflecting surfaces, each reflecting surface of said second set being arranged at a different angle to the axis of said rotating member, and means to receive the beam after its second reflection from said rotating member.

4. A device for the composition or decomposition of pictures comprising means for projecting a beam of light, a rotating member, a set of rotating reflecting surfaces on said rotating member located in the path of said beam and adapted to reflect said beam of light at an angle, a set of stationary reflecting surfaces located in the path of the beam from said rotating reflecting surfaces and adapted to reflect said beam of light at an angle, a second set of rotating reflecting surfaces on said rotating member located in the path of the beam from said stationary reflecting surfaces and adapted to reflect said beam of light at an angle, means to receive the beam from said second set of rotating reflecting surfaces, and the rotating reflecting surfaces of at least one of said sets being each inclined to the axis of rotation at an angle different from the angles at which the other reflecting surfaces of said set are inclined thereto.

5. The structure of claim 4, a cylindrical lens having its longitudinal axis at right angles to the axis of rotation located in the path of the beam of light projected onto said first set of rotating reflecting surfaces, and a second cylindrical lens having its longitudinal axis parallel to the axis of rotation located in the path of the beam of light reflected from said second set of rotating reflecting surfaces.

6. A device for the composition or decomposition of pictures comprising a polygonal rotating member, reflecting surfaces on the faces of said rotating member, a plurality of stationary reflecting surfaces each inclined at a different angle to a plane radial to their centers and to the axis of rotation and each arranged to receive a beam of light from one part of said reflecting surfaces of the rotating member and to reflect it onto another part of said reflecting surfaces of said rotating member, and the reflecting surfaces of at least one of said parts of said rotating member being each inclined at an angle to said axis of rotation different from the angles at which the other reflecting surfaces of said part are inclined thereto.

7. A device for the composition or decomposition of pictures comprising a polygonal rotating member having two parts, each of said parts comprising a plurality of reflecting faces, a plurality of stationary reflecting surfaces, means for projecting a beam of light successively onto the faces of one part of said rotating member, thence onto said stationary reflecting surfaces and thence back onto the faces of another part of said rotating reflecting member, and the faces of at least one of said parts of said rotating member being each inclined at an angle to said axis of rotation different from the angles at which the other faces of said part are inclined thereto.

8. A device for the composition or decomposition of pictures, said device comprising means for projecting a beam of light, a rotating member having at least two sets of reflecting surfaces thereon, the reflecting surfaces of one set being adapted to receive said beam and to reflect it at an angle to its original path, a plurality of fixed mirrors each inclined at different angles to planes radial to their centers and to the axis of said rotating member, said fixed mirrors being adapted to receive the light reflected from said first set of rotating reflecting surfaces and to reflect it onto the surfaces of said second set of rotating reflecting surfaces, the reflecting surfaces of at least one of said sets being each arranged at a different angle to the axis of said rotating member, and means to receive the beam after its second reflection from said rotating member.

9. A device for the composition or decomposition of pictures comprising means for projecting a beam of light, a rotating member, a set of rotating reflecting surfaces on said rotating member located in the path of said beam and adapted to reflect said beam of light at an angle, a set of stationary reflecting surfaces located in the path of the beam from said rotating reflecting surfaces and adapted to reflect said beam of light at an angle, a second set of rotating reflecting surfaces on said rotating member located in the path of said beam from said stationary reflecting surfaces and adapted to reflect said beam of light at an angle, means to receive the beam from said second set of rotating reflecting surfaces, the rotating reflecting surfaces of at least one of said sets being each inclined to the axis of rotation at an angle different from the angles at which the other reflecting surfaces of said set are inclined thereto, and the rotating reflecting surfaces of the other set being each inclined to the axis of rotation at an angle different from that of the corresponding surfaces of said first set of rotating reflecting surfaces.

10. A device for the composition or decomposition of pictures comprising means for projecting a beam of light, a rotating member, a set of rotating reflecting surfaces on said rotating member located in the path of said beam and adapted to reflect said beam of light at an angle, a set of stationary reflecting surfaces located in the path of the beam from said rotating reflecting surfaces and adapted to reflect said beam of light at an angle, a second set of rotating reflecting surfaces on said rotating member located in the path of said beam from said stationary reflecting surfaces and adapted to reflect said beam of light at an angle, means to receive the beam from said second set of rotating reflecting surfaces, the rotating reflecting surfaces of at least one of said sets being each inclined to the axis of rotation at an angle different from the angles at which the other reflecting surfaces of said set are inclined thereto, a cylindrical lens having its longitudinal axis at right angles to the axis of rotation located in the path of the beam of light projected onto said first set of rotating reflecting surfaces, and a second cylindrical lens having its longitudinal axis parallel to the axis of rotation located in the path of the beam of light reflected from said second set of rotating reflecting surfaces, and the rotating reflecting surfaces of the other set being each inclined to the axis of rotation at an angle different from that of the corresponding surface of said first set of rotating reflecting surfaces.

11. A device for the composition or decomposition of pictures comprising a polygonal rotating member having two parts, each of said parts comprising a plurality of reflecting faces, a plurality of stationary reflecting surfaces, means for projecting a beam of light successively onto the faces of one part of said rotating member, thence onto said stationary reflecting surfaces and thence back onto the faces of said other part of said rotating member, the faces of at least one of said parts of said rotating member being each inclined at an angle to said axis of rotation different from the angles at which the other faces of said part are inclined thereto, and the faces of said other part being each inclined at an angle to said axis of rotation different from that of the corresponding face of said first part of said rotating member.

12. A device for the composition or decomposition of pictures comprising a polygonal rotating member having a plurality of reflecting faces, a plurality of stationary reflecting surfaces, means for projecting a beam of light successively onto the faces of one part of said rotating member, thence onto the said stationary reflecting surfaces, and thence back onto the faces of another part of said rotating reflecting member, the faces of both of said parts of said rotating member being each inclined at an angle to said axis of rotation different from the angle at which the other faces of said parts are inclined thereto.

ERNEST TRAUB.